July 25, 1967 — R. D. SPANGLER — 3,332,281
DEVICE FOR MEASURING BIAXIAL STRESS-STRAIN
Filed Dec. 17, 1964 — 2 Sheets-Sheet 1

INVENTOR
ROSS D. SPANGLER

BY *[signature]*
ATTORNEY

INVENTOR
ROSS D. SPANGLER
BY *Lawton A. Burrows Jr.*
ATTORNEY

United States Patent Office 3,332,281
Patented July 25, 1967

3,332,281
DEVICE FOR MEASURING BIAXIAL
STRESS-STRAIN
Ross D. Spangler, West Chester, Pa., assignor to E. I. du Pont de Nemours and Company, Wilmington, Del., a corporation of Delaware
Filed Dec. 17, 1964, Ser. No. 419,002
2 Claims. (Cl. 73—100)

ABSTRACT OF THE DISCLOSURE

Device for measuring the biaxial stress-strain on a sheet of expandable material as it is blown into curved shape by compressed gas. Gas pressure, the sheet's radius of curvature, and strain are continuously measured, the latter by an extensometer comprising a low-starting-torque potential divider having a shaft which rotates as a thread it carries pays out in response to expansion of the sheet.

It is known that conventional uniaxial mechanical tests on solid propellants cannot give enough information to predict their mechanical suitability in rocket motors. Biaxial testing can, to some extent, remedy this situation. Accordingly, this invention provides a device which is particularly adapted for accurately measuring the biaxial strain-properties of solid propellants as well as other plastic and elastomeric materials. This device is also useful for the production of curved shaped articles from plastic sheets. In addition the strain measuring means of the device of the invention is independently useful for measuring strain in other operations where flexible sheets are being subjected to expansion in one or more dimensions. Another aspect of this invention is the improved clamping means wherein internal wedge grooves cooperate with O-rings to insure that the area within the clamped circumference can expand without formation of wrinkles or other non-uniformities.

The preferred embodiment of this invention comprises a flat porous plate supported at its periphery by a base member, annular clamping means for cooperating with said base member to fixedly engage the peripheral edge of a sheet of expandable material and initially position one side thereof in continuous contact with said plate, means for supplying compressed inert gas at a controlled rate through said plate and to said side of said sheet to thereby blow the sheet into a uniform curved shape, means for measuring and recording the gas pressure thus applied, means for measuring and recording the radius of curvature of the sheet as it expands, and means for measuring and recording the strain on said sheet, the strain measuring means comprising a low-starting-torque potential divider (sometimes referred to commercially as a potentiometer), a drive pulley mounted on the rotatable shaft of said potential divider, a thread having one of its ends wrapped around said pulley, anchor means for fastening the other end of said thread to a point on the surface of said sheet opposite its said one side, and guide means for slidably holding said thread contiguous to a second point on said surface, said first and second points originally defining a straight line which passes through the center of the area of said sheet within the clamping means, and said thread being adapted to pay out through said guide means and turn said pulley as the length of the arc between said points on the surface of the expanding sheet increases.

The invention is best described with reference to the accompanying drawings wherein.

Figure 1:
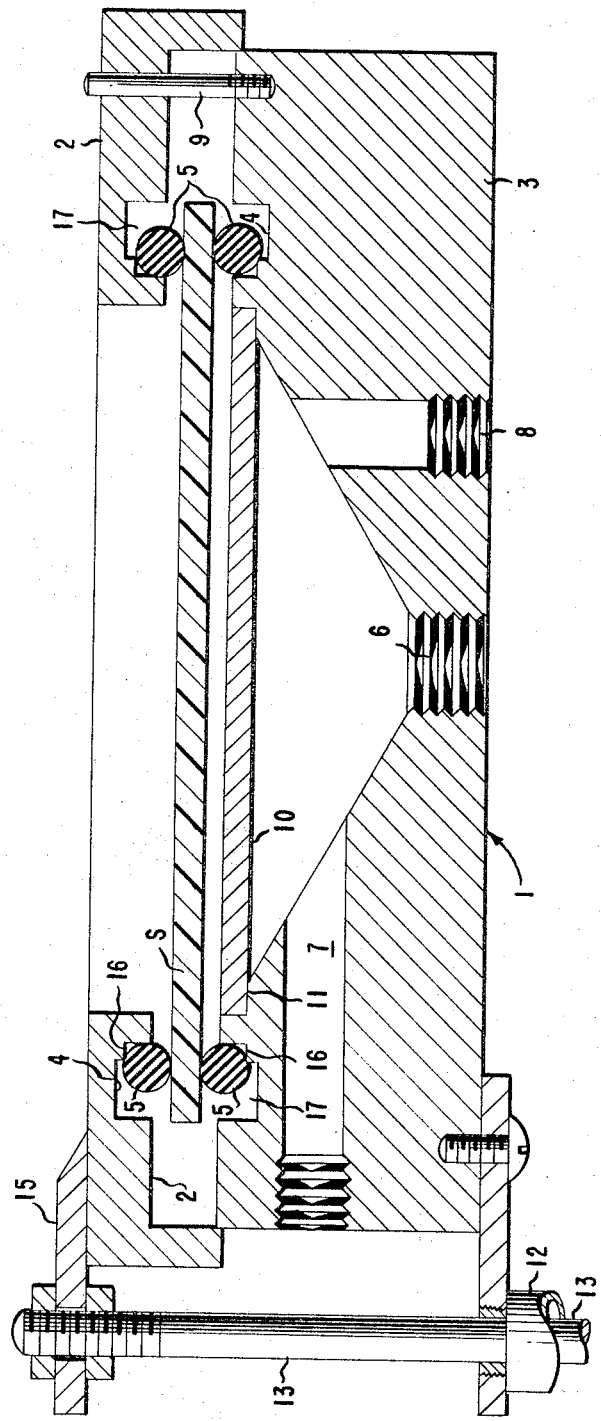
FIGURE 1 is a cross-sectional view of the tester block assembly of a preferred embodiment of this invention.

In FIGURE 1, 1 generally designates the tester block which is circular in horizontal cross-section and is composed of clamping ring 2 and base member 3, each of which is provided with a stepped annular wedge-groove 4 containing an O-ring 5. Base member 3 has a port 6 to admit air, a port 7 valved to atmosphere and a port 8 for connection to a pressure transducer, all for reasons which hereinafter appear. Base member 3 also carries a series of circumferentially spaced guide pins 9 (one shown) which pass through holes in clamping ring 2 for placing elements 2 and 3 in the proper relative position. Porous plate 10, which may be made of sintered stainless steel granules, is mounted in annular groove 11 in base member 3 so the specimen S of expandable material rests on it when clamped in test position. The porous plate supports the specimen in horizontal plane thereby providing a zero position for making measurements and also distributes the incoming air over the specimen surface. There should be no measurable pressure drop across plate 10 during such measurements.

To clamp the specimen in test position, it is first placed in the tester block as shown in FIGURE 1 with clamping ring 2 and O-rings 5 in their depicted positions. A series of uniformly, circumferentially spaced air cylinders 12 (one shown), e.g., six conventional air cylinders attached at 60° intervals to base member 3, are then simultaneously actuated to retract piston rods 13 which carry clamping lugs 15 at their upper ends. Lugs 15 are pivotally mounted on rods 13 so that they can be turned to free clamping ring 2. Since the cross-sectional radius of each O-ring 5 is slightly larger than the width of ledge 16 in each wedge-groove 4, pressure exerted on clamping ring 2 by lugs 15 causes the O-rings 5 to increase in diameter and thus roll over the edge of ledges 16 into groove sections 17 thereby pulling the specimen taut. As clamping pressure increases, the O-rings flatten forming an air-tight seal and forcing specimen S into continuous contact with porous plate 10.

Figure 2:
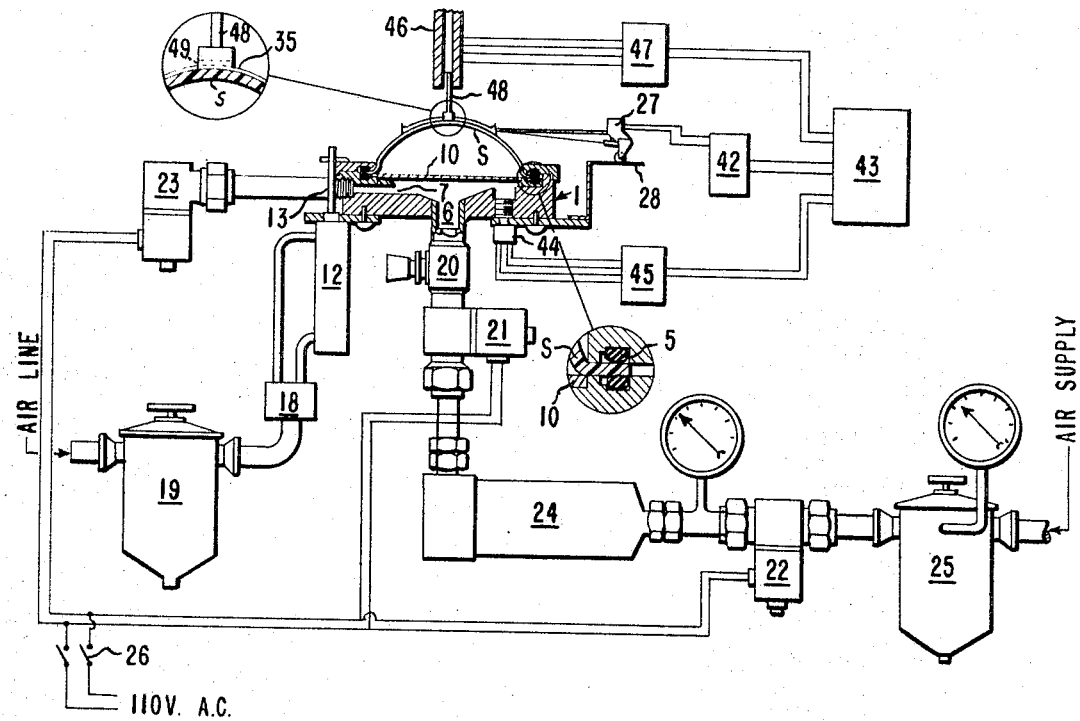
FIGURE 2 is a schematic view of a complete preferred embodiment of this invention employing the assembly of FIGURE 1.

Air cylinders 12 are conveniently controlled by three-way valve 18 and pressure regulator 19 (FIGURE 2). The pressure regulator permits adjusting the clamping force to requirements, usually in the range of about from 20 to 100 p.s.i.g., depending on the hardness and modulus of the sample being tested.

As shown in FIGURE 2, after the test specimen is clamped in position as described above, operation of the device is controlled by four valves: one graduated needle valve 20 and a normally closed solenoid valve 21, both of which are in the air supply line connected to port 6, and two normally open solenoid valves 22 and 23, the latter being connected to vent port 7. Valves 21, 22 and 23 are connected in parallel to a 110 volt (A.C.) current source (not shown) through switch 26. Additional regulation of air pressure may be accomplished with an accumulator 24 and pressure regulator 25 which is connected to an air source not shown. The rate of straining of the specimen is controlled by the setting of the pressure regulator 25 and needle (throttle) valve 20. Proper settings for a given strain rate are determined by experiment. It usually is convenient to operate at strain rates about between 0.01 and 100 inches per inch per minute. Additional control over strain rate, particularly over constancy of strain rate for a given test, is obtained by use of the accumulator 24 and the normally open solenoid valve 22 open. With some specimens the slope of the strain-time curve may increase with time under these conditions; this may be controlled by closing solenoid valve 22 at the instant valve 21 is opened. Thus the pressure ahead of throttle valve 20 decreases with time (determined by the volume of the accumulator 24) and prevents the strain rate from increasing as time progresses.

Figure 3:
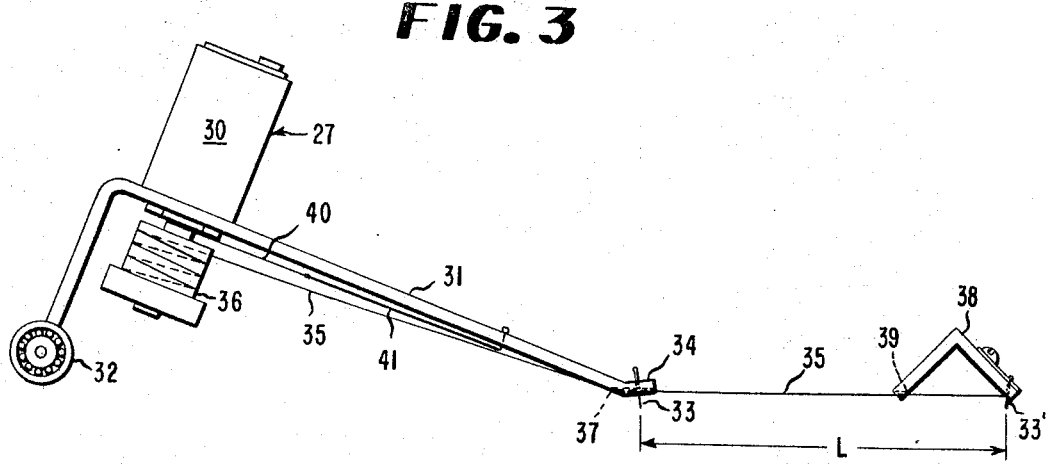
FIGURE 3 is a plan view of the extensometer employed in the combination of FIGURE 2.

Strain is measured by the extensometer detailed in FIGURE 3 and generally designated 27 in FIGURE 2, where it is shown mounted on platform 28 which is conveniently fastened to base member 3. The extensometer consists of a low-starting-torque, carbon film potential divider 30 mounted on a carriage 31. One end of the carriage is supported on wheels 32 made of small ball-bearing races which are free to roll on horizontal platform 28 (FIGURE 2). The other end of the carriage is fitted with two small needlepoints 33 (only one seen) which project through the carriage tongue 34 about 0.03 inch and serve to anchor it to the specimen. A thread 35 of any material which will not stretch under test conditions is wrapped around pulley 36, which is fastened to the rotatable shaft of potentiometer 30, and runs between needlepoints 33 in guide groove 37 to an anchor block 38, where it passes through guide groove 39 and then between two needlepoints 33' (one seen) to the rear of block 38 where it is fastened in any suitable manner. Integral guide means 37 in tongue 34 holds the thread to the surface of the specimen, and tongue 34 and anchor block 38 are fastened to the specimen by means of their respective pairs of needlepoints 33 and 33' such that thread 35 originally defines a straight line which passes through the center of the area of the specimen within the clamping rings. In a test the distance between the two sets of anchor points increases as the sheet expands causing thread to pay out from the pulley on the potential divider. This causes a rotation of the shaft of the potential divider proportional to the change $\Delta L$ in length L. One and one-half volts between the two outside terminals of the potential divider provide enough voltage between one of them and the sliding terminal to give a one-inch deflection on the recorder chart for a $\Delta L$ of ⅛ in. A small amount of tension is maintained on the measuring thread 35 as it pays out by arranging a second thread 40 to wind up on the shaft of the potential divider. This elongates a rubber band 41 and provides a restoring torque to maintain tension and return the potential divider to its zero position.

As shown in FIGURE 2, the extensometer is connected through a galvanometer amplifier 42 which matches the impedance of the strain-measuring device to that in the recorder, to a high speed direct writing optical recorder 43 such as that known commercially as the "Visicorder." The low input resistance of the galvanometer amplifier requires that the resistance of the potential divider be relatively small, on the order of 1000 ohms, to insure linearity of the system. The extensometer is calibrated by relating distances between the two sets of needlepoints (as measured by a steel ruler) to the incremental distance recorder on the "Visicorder."

The strain, $e_r$, is given by $$e_r = \frac{\Delta L}{L}$$

The stress, S, in the bubble is calculated from the formula $$S = \frac{pR}{2t}$$

where $p$ = gage pressure
$R$ = radius of curvature
$t$ = initial thickness of specimen The pressure, $p$, is obtained from a continuous recording of the output of strain gage pressure transducer 44 of FIGURE 2, which is connected to "Visicorder" 43 through carrier amplifier 45. The radius of curvature, R, of the bubble is obtained from a recording on the "Visicorder" of the height, $h$, of the bubble, which is measured with a linear variable differential transformer 46 connected to the recorder through carrier amplifier 47. The formula is $$R = \frac{h^2 + r^2}{2h}$$

where $r$ is the internal radius of clamping ring 2 (FIGURE 1). The vertically slidable sensor 48 of linear variable differential transformer 46 has groove 49 in its bottom surface so that free movement of thread 35 under the sensor will not be impaired.

What is claimed is:

1. A device comprising a flat porous plate supported at its periphery by a base member, annular clamping means for cooperating with said base member to fixedly engage the peripheral edge of a sheet of expandable material and initially position one side thereof in continuous contact with said plate, means for supplying compressed inert gas at a controlled rate through said plate and to said side of the sheet to thereby blow the sheet into a uniform curved shape, means for continuously measuring and recording the gas pressure thus applied, means for continuously measuring and recording radius of curvature of the sheet as it expands, and means for continuously measuring and recording the strain on said sheet, the strain measuring means comprising a low-starting-torque potential divider having a rotatable shaft, a drive pulley fastened to said shaft, a thread having one of its ends wrapped around said pulley, anchor means for fastening the other end of said thread to a point on the surface of said sheet opposite its said one side, and guide means for slidably holding said thread contiguous to a second point on said surface, said first and second points defining a straight line originally passing through the center of the area of said sheet within the clamping means, and said thread being adapted to pay out through said guide means and turn said pulley as the length of the arc between said points on the surface of the expanding sheet increases.

2. A device of claim 1 wherein said clamping means and base member each have an annular wedge-groove containing an O-ring, the groove and O-ring in said clamping means being aligned with the groove and O-ring in said base member.

References Cited

UNITED STATES PATENTS

| | | | |
|---|---|---|---|
| 2,767,476 | 10/1956 | Strimel | 33—148 |
| 3,001,291 | 9/1961 | Sjostrom | 33—148 |
| 3,008,328 | 11/1961 | Cope et al. | 73—100 |

FOREIGN PATENTS

| | | |
|---|---|---|
| 158,435 | 3/1964 | Russia. |

DAVID SCHONBERG, *Primary Examiner.*